No. 773,070.

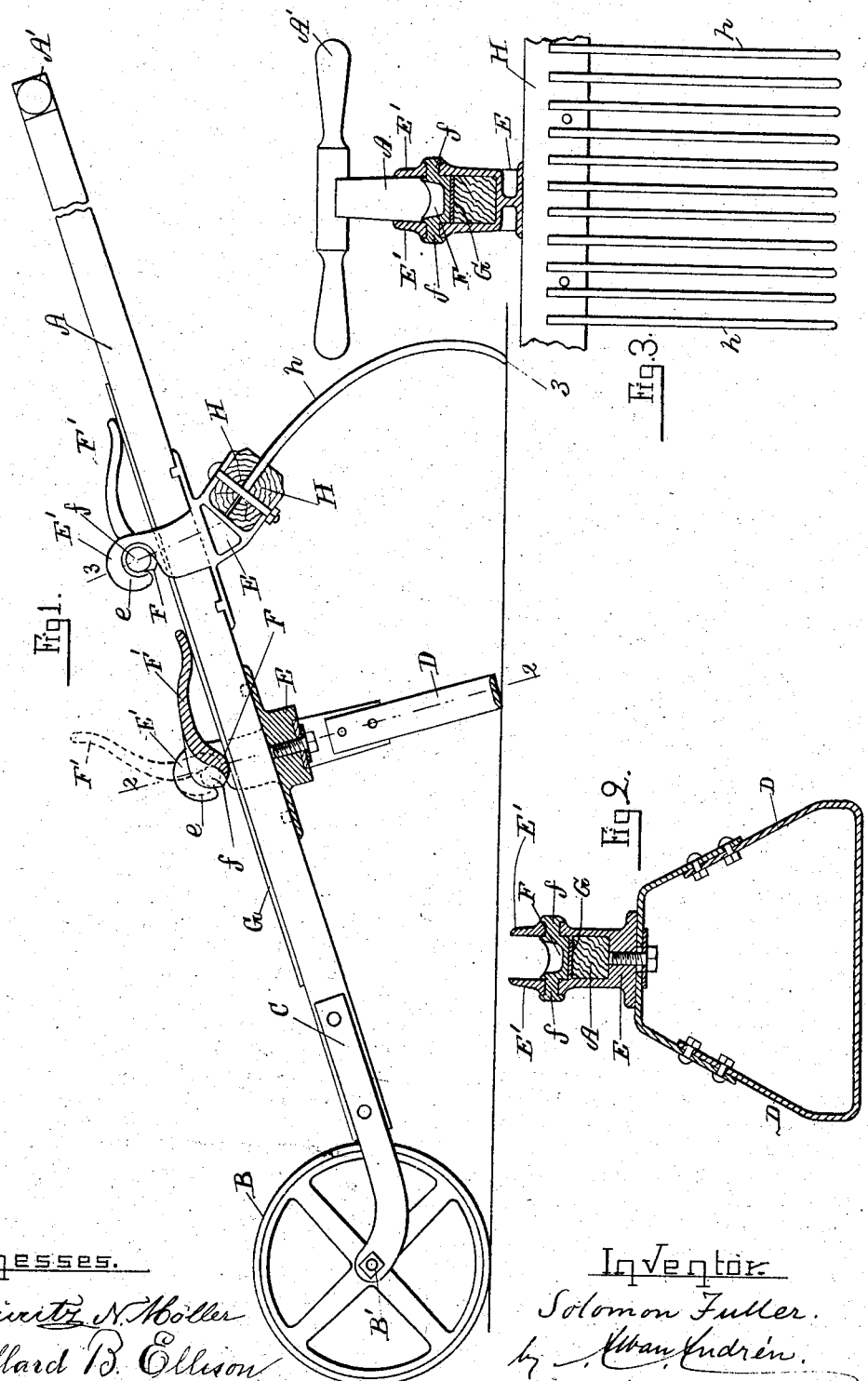

Patented October 25, 1904.

UNITED STATES PATENT OFFICE.

SOLOMON FULLER, OF DANVERS, MASSACHUSETTS.

WHEEL HOE OR WEEDER.

SPECIFICATION forming part of Letters Patent No. 773,070, dated October 25, 1904.

Application filed March 8, 1904. Serial No. 197,134. (No model.)

*To all whom it may concern:*

Be it known that I, SOLOMON FULLER, a citizen of the United States, and a resident of Danvers, in the county of Essex and State of Massachusetts, have invented certain new and useful Improvements in Wheel Hoes or Weeders, of which the following is a specification.

This invention relates to improvements in wheel hoes or weeders for the purpose of hoeing or weeding beets, parsnips, and other vegetables usually planted in rows; and it relates especially to means for securing the hoe or weeder-tool in an adjustable manner to the handle-bar or wheel-frame as may be needed, for the purpose of adjusting the hoe or weeder-tool in proper position relative to the wheel for the convenience of the operator, as will hereinafter be more fully described, reference being had to the accompanying drawings, wherein—

Figure 1 is a side elevation of the improved wheel hoe or weeder, showing the hoe or weed-cutter in section. Fig. 2 is a cross-section on the line 2 2 shown in Fig. 1, and Fig. 3 is a cross-section on the line 3 3 shown in Fig. 1.

Similar letters refer to similar parts wherever they occur on the different parts of the drawings.

In the drawings, A represents a frame or handle-bar having a suitable handle A' in its upper end and provided in its lower end with a wheel B, journaled on a pin or bolt B', passing through perforations in plates C C, secured to the lower end of the bar A, as is common in devices of this kind.

D represents the skeleton-shaped hoe or weed-cutter, as usual, preferably secured in an adjustable manner to a metal casting E, normally held against the under side of the frame or handle-bar A by my improved clamping device, which is constructed as follows: Integral with said casting E are made forked ears E' E', between which the handle-bar A is guided. The upper ends of said ears E' are hooked at $e$, as shown, and adapted to receive trunnions $f\,f$, made integral with a locking-cam F, provided with a lever F', as shown. In practice I prefer to interpose between the said cam and the upper surface of the handle-bar a spring-plate G for the purpose of preventing the upper surface of the handle-bar or frame A from being worn or defaced by the pressure of the cam F onto the said bar or frame A. When it is desired to adjust the position of the hoe or weed-cutter on the bar A, it is only necessary to swing the cam-lever F' to the position shown in dotted lines in Fig. 1, causing the cam F to be released from the plate G and bar A, after which the hoe or weeder-carrying plate E may be readily adjusted to and from the forward end of said bar A to the desired position thereon and firmly clamped in such position simply by swinging the lever F'' from the position shown in dotted lines to the full lines shown in Fig. 1. If it is desired to remove the hoe or weeder from the frame or bar A, this can easily be done by swinging the lever F' forward and detaching it from the hooked ears E' E'. Back of said hoe or cutter may be located a similar casting E, provided with clamping-bars H H and curved pulverizer-prongs $h\,h\,h$ of the kind usually employed in weeder-machines. Such pulverizer or pronged weeder is provided with an adjustable clamping device like that shown on the hoe or cutter hereinabove described.

In machines of this kind both a hoe or cutter and a pronged weeder may be employed, or either one may be used separately on the handle-bar, as may be desired. Also in machines of this kind a frame is used composed of two bars and a pair of wheels, and I wish to state that I do not limit my clamping and adjusting device to a device having a frame composed of a single bar only, as I may desire to use such clamping device on duplex-wheel frames as well as on single-wheel frames without departing from the essence of my invention.

Having thus fully described the nature, construction, and operation of my invention, I wish to secure by Letters Patent and claim—

1. In an agricultural implement, an adjustable clamping device for a hoe or weeder, said device consisting of a plate adapted to carry the hoe or weeder, a pair of upwardly-extending ears adapted to extend parallel with one of the bars of the implement and project above the same, said ears having hooked upper ends so as to form recesses, and a cam-lever having trunnions extending in the recesses of the ears and adapted when operated to connect and disconnect the hoe or weeder to and from the bar.

2. In an agricultural implement, an adjustable clamping device for a hoe or weeder, said device consisting of a plate adapted to be arranged against the lower face of one of the bars of the implement, a pair of upwardly-extending ears integral with said plate and terminating at their ends in hooks, and a cam-lever connected with said ears through the medium of the hooks and adapted when operated to connect and disconnect said plate to and from said bar.

3. In an agricultural implement, an adjustable clamping device for a hoe or weeder, said device consisting of a plate adapted to carry the hoe or weeder, a pair of upwardly-extending ears adapted to extend parallel with one of the bars of the implement and project above the same, said ears having hooked upper ends so as to form recesses, a cam-lever having trunnions extending in the recesses of the ears and adapted when operated to connect and disconnect the hoe or weeder to and from said bar, and a plate interposed between said lever and said bar.

4. In an agricultural implement, an adjustable clamping device for a hoe or weeder, said device consisting of a plate adapted to be arranged against the lower face of one of the bars of the implement, a pair of upwardly-extending ears integral with said plate and terminating at their ends in hooks, a cam-lever connected with said ears through the medium of the hooks and adapted when operated to connect and disconnect said plate to and from said bar, and a plate interposed between said lever and said bar.

In testimony whereof I have affixed my signature in presence of two witnesses.

SOLOMON FULLER.

Witnesses:
ALBAN ANDRÉN,
SAMUEL P. WHITE.